(12) United States Patent
Yu et al.

(10) Patent No.: US 6,553,854 B2
(45) Date of Patent: Apr. 29, 2003

(54) MECHANICAL SPEED MEASURING DEVICE FOR A BEACH BUGGY

(75) Inventors: Michael Yu, Tainan Hsien (TW); Jeff Huang, Tainan Hsien (TW); Judge Fu, Tainan Hsien (TW); Tony Chen, Tainan Hsien (TW)

(73) Assignee: Aeon Motor Co., Ltd., Tainan Hsien (TW)

( * ) Notice: Subject to any disclaimer, the term of this patent is extended or adjusted under 35 U.S.C. 154(b) by 89 days.

(21) Appl. No.: 09/948,540

(22) Filed: Sep. 10, 2001

(65) Prior Publication Data

US 2003/0047000 A1 Mar. 13, 2003

(51) Int. Cl.[7] .............................................. F16H 37/00
(52) U.S. Cl. ............................................. 74/12; 73/494
(58) Field of Search ............................... 74/12; 73/494; 180/219

(56) References Cited

U.S. PATENT DOCUMENTS

| | | | | |
|---|---|---|---|---|
| 1,298,646 A | * | 4/1919 | Berg | 74/12 |
| 1,465,003 A | * | 8/1923 | Schulze | 74/12 |
| 4,869,120 A | * | 9/1989 | Kashiwai et al. | 74/12 |

* cited by examiner

Primary Examiner—William C Joyce
(74) Attorney, Agent, or Firm—Bacon & Thomas, PLLC

(57) ABSTRACT

A speed measuring device for a beach buggy includes a chain wheel rotated by the engine of a buggy, a connecting tube firmly connected to the chain wheel, a bearing fitted in the connecting tube, a gear set, and a fixing unit combined together. The fixing plate, the gear set, the connecting tube and the bearing are assembled together with an elongate rod with thread formed in the lower end portion and then fixed with the chain wheel. Then a hole base is formed on a rear small diameter portion of the gear set for a cable to extend in to transmit speed of the rotating chain wheel to a speedometer for a user to know the speed of the beach buggy.

2 Claims, 4 Drawing Sheets

A

MECHANICAL SPEED MEASURING DEVICE FOR A BEACH BUGGY

BACKGROUND OF THE INVENTION

This invention relates to a mechanical measuring device for a beach buggy, particularly to one easy to assemble and attach on a beach buggy, measuring the rotating speed of a chain wheel of an engine, saving cost for the speed measuring device and having effect of acquiring accuracy of measuring.

A common conventional mechanical measuring device for a beach buggy has a shaft of two wheels is positioned with a direction changing joint to have only one end of the shaft positioned so that the speed measuring device has a single side locking frame. When the shaft of the single side locking frame positions the gear sets of a mechanical speed measuring device, a very complicated structure is needed, because the shaft of the wheels of a beach buggy only has one end firmly positioned with the direction changing joint. So the gear set of the speed-measuring device is not easily fixed, and if compulsorily fixed, the gear set has to be kept in place with a complicated structure causing a high cost.

SUMMARY OF THE INVENTION

The objective of the invention is to offer a mechanical speed-measuring device for a beach buggy easy to assembly and attach on the chain wheel of an engine of a beach buggy, lowering effectively its cost.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
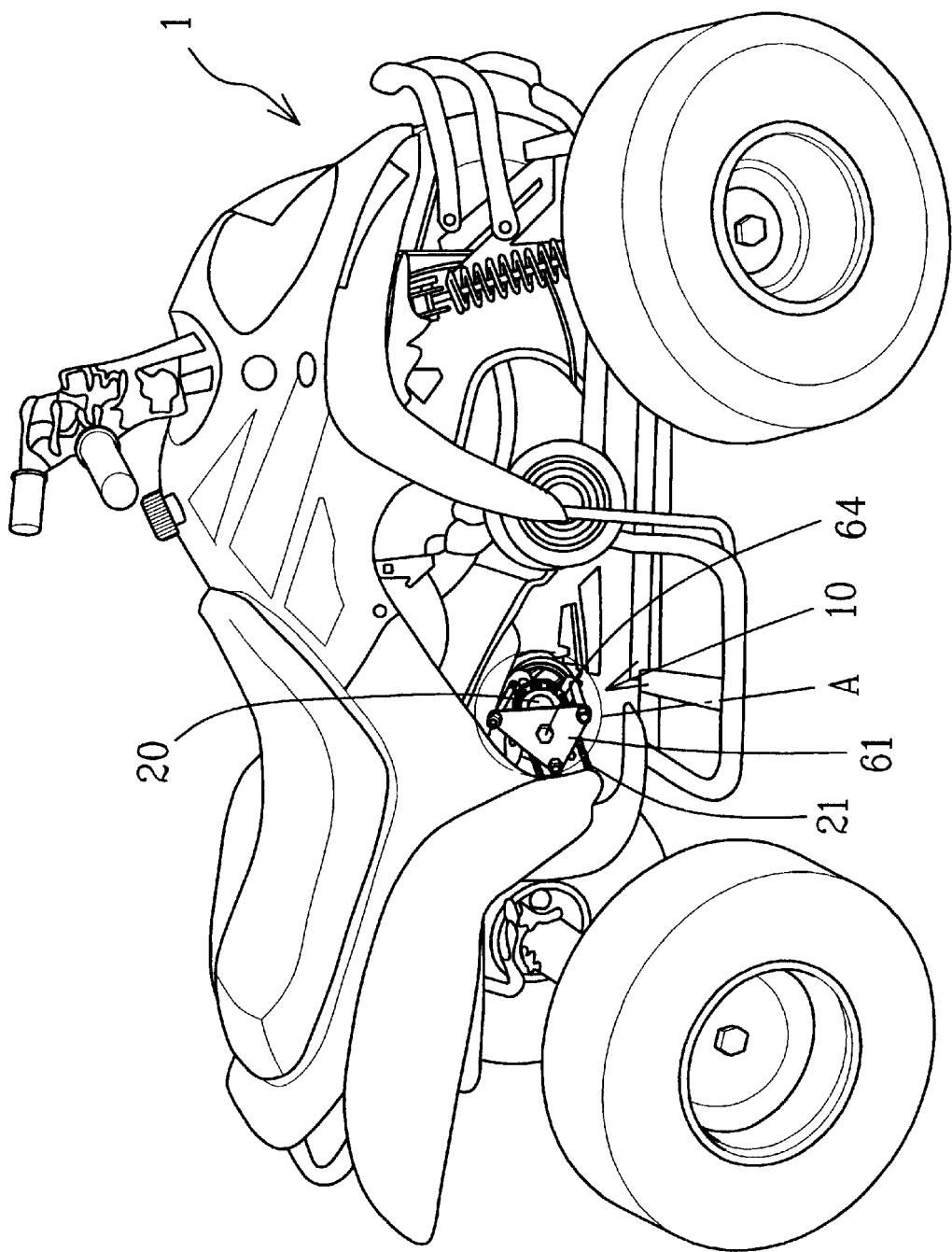
FIG. 1 is a perspective view of a speed-measuring device attached on a beach buggy in the present invention.
Figure 2:
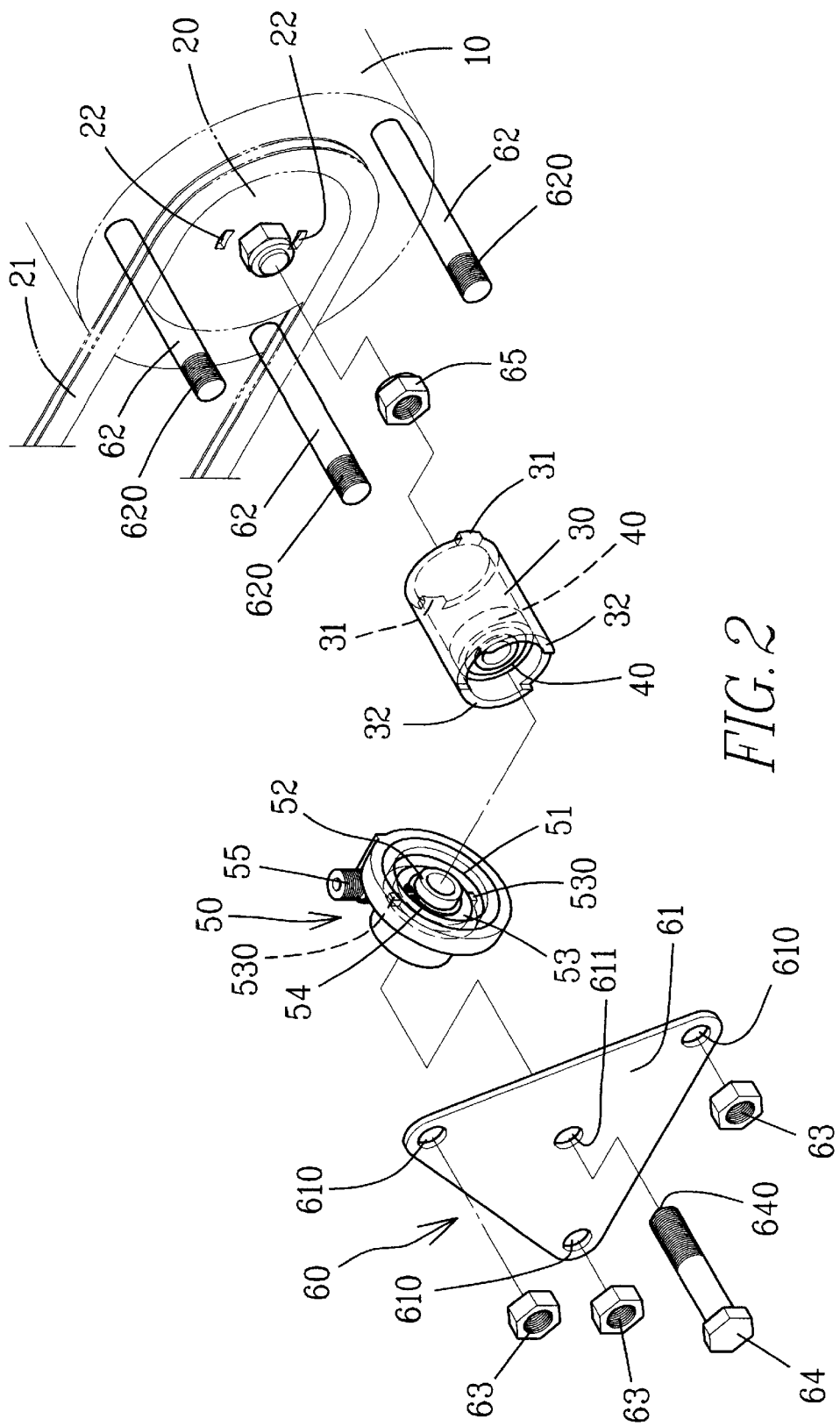
FIG. 2 is an exploded perspective view of the speed-measuring device for a beach buggy in the present invention.

A preferred embodiment of a speed measuring device for a beach buggy in the present invention, as shown in FIGS. 1 and 2, includes a chain wheel 20, a connecting tube 30, a bearing 40, a gear set 50, and a fixing unit 60 combined together and then fixed on a chain wheel 20 combined with an engine 10 of a beach buggy 1.

The chain wheel 20 is fixed on one side of the engine 10 of a beach buggy 1, and rotated by the engine 10.

The connecting tube 30 is hollow, having at least two engage projections 31 extending out of a front end toward the surface of the chain wheel 20, which has at least two engage holes 22 in its surface for the engage projections 31 to insert therein so that the connecting tube 30 is firmly combined with the chain wheel 20 and rotates together with the chain wheel 20.

The bearing 40 is fixed in the connecting tube 30.

The gear set 50 has a front large diameter portion and a rear small diameter portion, an annular groove 51 formed in an inner surface of the front large diameter portion for receiving a rear end of the connecting tube 30, a hollow sleeve 52 fixed in a center hole of the front large diameter portion, an annular rotatable ring 53 fitting around the sleeve 52 and fixed firmly with a locking C-shaped washer 54 to limit the annular ring 53 only driven to rotate at its position. Further, the annular ring 53 has two opposite projecting wings 530 on an outer edge to rest against respectively two projections 32 provided on the rear end of the connecting tube 30 and located between the two wings 530. Therefore, when the connecting tube 30 is rotated by the chain wheel 20, the two projections 32 with their end edges resting against the two wings 530 may rotate the annular ring 53 synchronously. The gear set 50 further has a hole base 55 formed on the rear small diameter portion for a cable capable to measuring speed to extend through, and the cable transmits the speed of the chain wheel measured to a speedometer for a user to know the speed of the beach buggy.

The fixing unit 60 is to combine firmly the connecting tube 30, the bearing 40 and the gear set 50 on the chain wheel 20 of the engine 10 of a beach buggy 1, mainly composed of a triangular fixing plate 61 with a hole 611, 610 respectively bored in the center and three corners. The chain wheel 20 has three bars 62 corresponding to fit in the three holes 610 as shown in FIG. 2. The three bars 62 each have threads 620 formed in an outer end to engage with a nut 63 at the outside of the corner holes 610. Then an elongate rod 64 passes through the center hole 611, the center hole of the annular ring 52, the bearing 40 and then engage a nut 65 with threads formed in its lower end portion in the connecting tube 30, combining the fixing plate 61, the gear set 50, the bearing 40 and the connecting tube all together.

In assembling all those components of the speed-measuring device, firstly the fixing plate 61, the gear set 50, the bearing 40 and the connecting tube 30 are firmly positioned by the elongate rod 64 with threads and the nut 65. Then the two projections 31 of the connecting tube 30 are inserted in the two engage holes 22 of the chain wheel 20, and at the same time the three posts 62 of the chain wheel 20 are made to pass through the three corner holes 610 of the fixing plate 61 and then screwed with the nuts 63 tightly. Thus, the speed-measuring device for a beach buggy is stably attached on one side of the engine 10 of the beach buggy 1, as shown in FIGS. 3 and 4.

As known from the aforesaid description, the speed measuring device for a beach buggy in the invention is fixed on one side of the engine 10 of a beach buggy, not fixed on a shaft of the wheels as the conventional one described above. Therefore, it is stabilized firmly, improving defects of unstable assembly of the conventional speed-measuring device, and at the same time, its attaching process is very simple and not so complicated as the conventional one.

Figure 3:
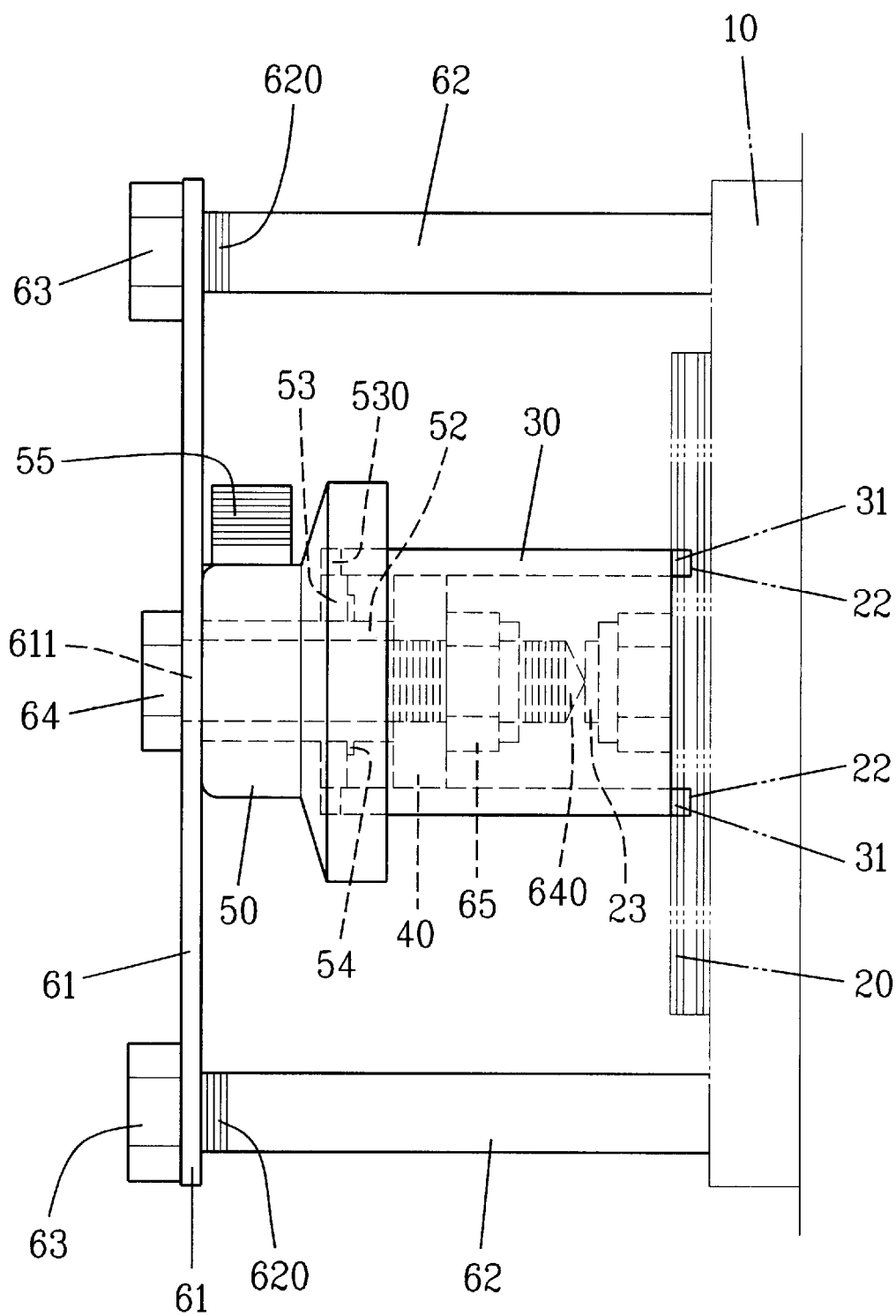
FIG. 3 is a cross-sectional view of the speed measuring device for a beach buggy in the present invention and, FIG. 4 is a perspective view of the speed-measuring device fixed on a beach buggy in the present invention.
Figure 4:
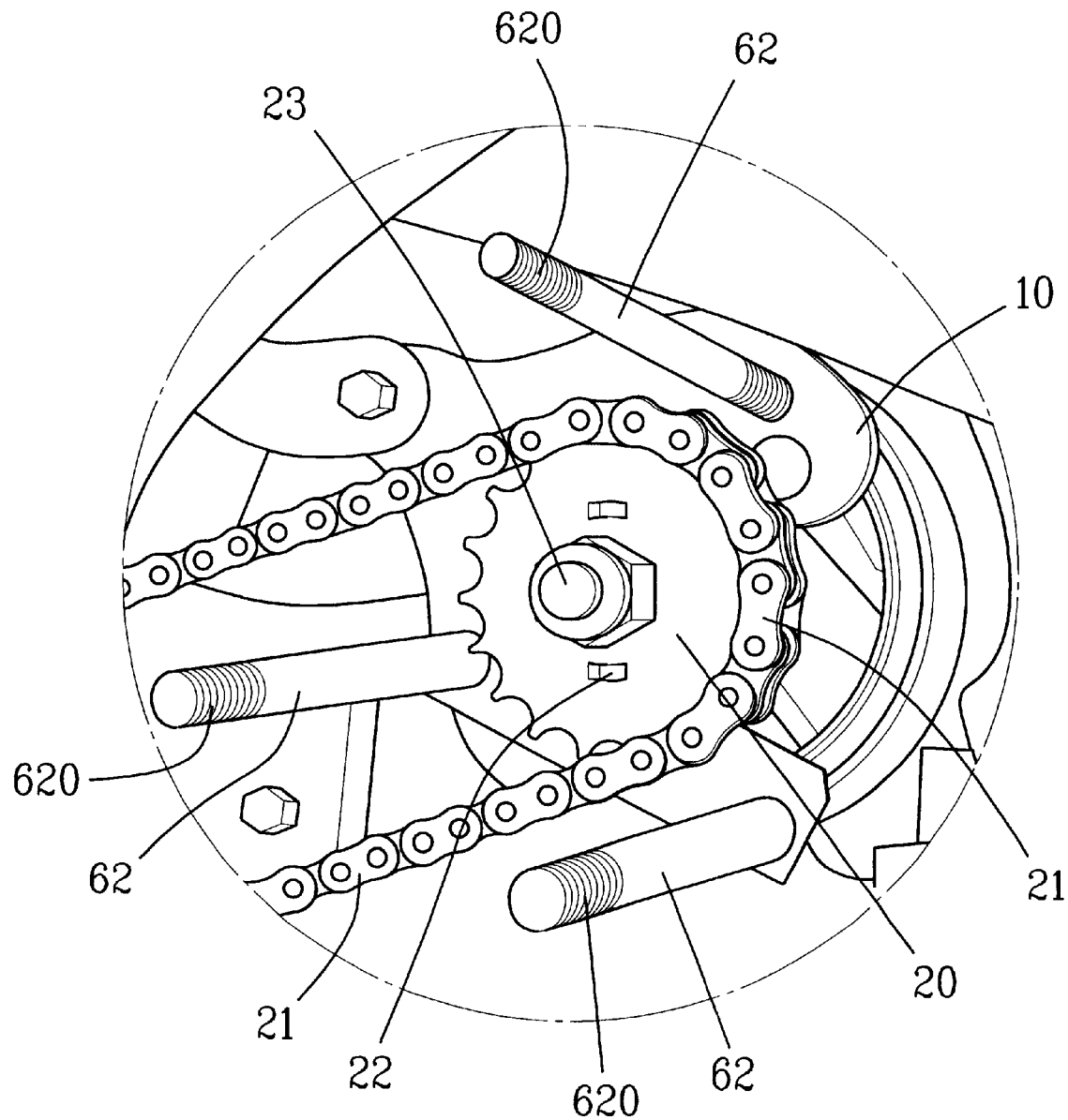

Moreover, it is worth to mention that the pointed lower end 640 of the elongate rod 64 extending in the connecting tube 30 rests against the center of the end of the shaft 23, referring to FIGS. 2 and 3, enabling the connecting tube 30 rotate correctly against the shaft.

While the preferred embodiment of the invention has been described above, it will be recognized and understood that various modifications may be made therein and the appended claims are intended to cover all such modifications that may fall within the spirit and scope of the invention.

We claim:

1. A mechanical speed measuring device for a beach buggy comprising:

a chain wheel rotated by an engine of a beach buggy, having a plurality of engage holes bored in its surface;

a hollow connecting tube, having a plurality of projections extending from a front end and facing said engage holes of said chain wheel, said projections inserted in said engage holes to combine said connecting tube with said chain wheel to rotate together;

a bearing fitted in said connecting tube;

a gear set having a large diameter rear portion and a small diameter portion, an annular recess formed in an inner surface of said large diameter rear portion for a rear end of said connecting tube to fit therein, a sleeve fixed in a center of the inner surface of said large diameter rear portion, an annular ring fitted around said sleeve from rotation therewith, said annular ring having two opposite wings formed on an outer edge, said connecting tube having two projections on a rear end to abut on said two wings; an annular base formed on said rear small diameter portion of said gear set, said annular base having a hole for a cable to measure speed to pass through so that said cable may transmit a measured speed to a speedometer;

a fixing unit comprising a triangular fixing plate, said triangular fixing plate having a hole in a center portion and in three corners thereof, said chain wheel facing said fixing plate, three posts passing though the three corner holes of said fixing plate, each post having threads formed in a lower end portion thereof and engaged with a nut, an elongate rod with threads formed in a lower end portion passing through the center hole of said fixing plate, a center hole of said gear set and in said bearing in said connecting tube, said threads of the elongate rod engaging a nut;

said fixing plate, said gear set, said bearing and said connecting tube assembled with each other with said elongate rod, said projections of said connecting tube inserting in said holes of said chain wheel, said three posts passing through the three corner holes of said fixing plate and screwed with a nut to complete assembly of said speed measuring device.

2. The mechanical speed measuring device for a beach buggy as claimed in claim 1, wherein said elongate rod has a pointed cone shaped end to rest against a center of a shaft of the chain wheel to correctly align to a shaft center.

* * * * *